US012717988B2

(12) United States Patent
Asano et al.

(10) Patent No.: US 12,717,988 B2
(45) Date of Patent: Aug. 25, 2026

(54) SIMULATION METHOD, SIMULATION APPARATUS, STORAGE MEDIUM, FILM FORMING METHOD, AND METHOD OF PRODUCING CURED PRODUCT

(71) Applicant: CANON KABUSHIKI KAISHA, Tokyo (JP)

(72) Inventors: Tosiya Asano, Tochigi (JP); Junichi Seki, Kanagawa (JP); Yuichiro Oguchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/754,396

(22) Filed: Jun. 26, 2024

(65) Prior Publication Data

US 2024/0346209 A1 Oct. 17, 2024

Related U.S. Application Data

(63) Continuation of application No. 16/893,994, filed on Jun. 5, 2020, now Pat. No. 12,079,551.

(30) Foreign Application Priority Data

Jun. 11, 2019 (JP) ................................ 2019-109021

(51) Int. Cl.

| | |
|---|---|
| ***G06F 30/23*** | (2020.01) |
| ***G03F 7/00*** | (2006.01) |
| ***G06F 113/08*** | (2020.01) |

(52) U.S. Cl.

CPC ............ *G06F 30/23* (2020.01); *G03F 7/0002* (2013.01); *G06F 2113/08* (2020.01)

(58) Field of Classification Search

CPC ........ G06F 30/23; G06F 30/25; G06F 30/367; G06F 30/398; G06F 2113/08;

(Continued)

(56) References Cited

U.S. PATENT DOCUMENTS

| | | | |
|---|---|---|---|
| 9,201,990 | B2 | 12/2015 | Wakamatsu |
| 2005/0270312 | A1 | 12/2005 | Lad |

(Continued)

FOREIGN PATENT DOCUMENTS

| | | | |
|---|---|---|---|
| CN | 108602346 | A | 9/2018 |
| JP | 5599356 | B2 | 10/2014 |

(Continued)

OTHER PUBLICATIONS

Mohseni, S. M., G. Fernlund, and M. Lane. "Cure cycle design to suppress moisture-driven bubble growth in polymer composites." Journal of Composite Materials 52.13 (2018): 1821-1832. (Year: 2018).*

(Continued)

*Primary Examiner* — Michael Edward Cocchi
(74) *Attorney, Agent, or Firm* — ROSSI, KIMMS & McDOWELL LLP

(57) ABSTRACT

The present invention provides a simulation method of predicting a behavior of a curable composition in a process of bringing a plurality of droplets of the curable composition arranged on a first member into contact with a second member and forming a film of the curable composition in a space between the first member and the second member, wherein for each of the plurality of droplets of the curable composition, a distance from a representative point of the droplet to a point on a contour of the droplet is obtained so as to match the area of the inner region of the contour to an area of the droplet obtained from a volume of the droplet and a distance between the first member and the second member in accordance with a change of the distance between the first member and the second member.

12 Claims, 9 Drawing Sheets

(58) Field of Classification Search
CPC .......... G06F 30/20; G06F 30/27; G06F 30/28; G03F 7/0002; G03F 7/161; G03F 7/2012
See application file for complete search history.

(56) References Cited

U.S. PATENT DOCUMENTS

| | | | | |
|---|---|---|---|---|
| 2006/0111454 A1 | 5/2006 | Xu et al. | | |
| 2009/0115110 A1* | 5/2009 | Schumaker | B82Y 40/00 | 264/401 |
| 2013/0249981 A1* | 9/2013 | Nakagawa | B29C 43/021 | 347/9 |
| 2014/0131313 A1* | 5/2014 | Wakamatsu | G03F 7/0002 | 703/2 |
| 2016/0129614 A1 | 5/2016 | Yamazaki et al. | | |
| 2017/0263510 A1 | 9/2017 | Baba et al. | | |
| 2017/0285463 A1* | 10/2017 | Ito | C09D 133/06 | |

FOREIGN PATENT DOCUMENTS

| | | |
|---|---|---|
| KR | 1020100088015 A | 8/2010 |
| KR | 1020140031882 A | 3/2014 |
| KR | 1020160054405 A | 5/2016 |
| TW | 201826023 A | 7/2018 |

OTHER PUBLICATIONS

Reddy, Shravanthi, and Roger T. Bonnecaze. “Simulation of fluid flow in the step and flash imprint lithography process.” Microelectronic Engineering 82.1 (2005): 60-70. (Year: 2005).*
Luo et al. “An efficient finite element method for simulation of droplet spreading on a topologically rough surface” Journal of Computational Physics 349 (2017) 233-252 (Year: 2017).*
Mohseni, S. M., G. Femlund, and M. Lane. “Cure cycle design to suppress moisture-driven bubble growth in polymer composites.” Journal of Composite Materials 52.13 (2018): 1821-1832. (Year: 2018).*
Office Action issued in Taiwanese Application No. 113111156 dated Jul. 2, 2024. English translation provided.
Extended European Search Report issued in European Appln. No. 20179230.6 mailed Nov. 13, 2020.
Xing. “Simulation of droplet formation and coalescence using lattice Boltzmann-based single-phase model.” Journal of Colloid and Interface Science. 2007: 609-618. vol. 311.
Decent, S. P., et al. “The formation of a liquid bridge during the coalescence of drops.” International Journal of Multiphase Flow. 32.6 (2006): 717-738. (Year: 2006).
Chauhan, Siddharth, et al. “Feature filling modeling for step and flash imprint lithography.” Journal of Vacuum Science & Technology B: Microelectronics and Nanometer Structures Processing, Measurement, and Phenomena 27.4 (2009): 1926-1932. (Year: 2009).
Office Action issued in Chinese Application No. 202010527360.2, mailed Aug. 3, 2023. English translation provided.
Reddy, Shravanthi, et al. “Simulation of fluid flow in the step and flash imprint lithography process” Microelectronics Engineering. 82.1 (2005): 60-70. (Year: 2005).
Amado Becker, “Characterization and prediction of SLS processability of polymer powders with respect to powder flow and part warpage” Diss. ETH Zurich, 2016. (Year: 2016).
Office Action issued in U.S. Appl. No. 16/893,994 mailed Sep. 13, 2021.
Office Action issued in U.S. Appl. No. 16/893,994 mailed Feb. 1, 2022.
Office Action issued in U.S. Appl. No. 16/893,994 mailed Aug. 1, 2022.
Office Action issued in U.S. Appl. No. 16/893,994 mailed Feb. 24, 2023.
Office Action issued in U.S. Appl. No. 16/893,994 mailed Oct. 4, 2023.
Notice of Allowance issued in U.S. Appl. No. 16/893,994 mailed May 14, 2024.

* cited by examiner

SIMULATION METHOD, SIMULATION APPARATUS, STORAGE MEDIUM, FILM FORMING METHOD, AND METHOD OF PRODUCING CURED PRODUCT

BACKGROUND OF THE INVENTION

Field of the Invention

The present invention relates to a simulation method, a simulation apparatus, and a storage medium. The present invention further relates to a film forming method and a method of producing a cured product.

Description of the Related Art

There is provided a film forming technique of forming a film made of a cured product of a curable composition on a substrate by arranging the curable composition on the substrate, bringing the curable composition into contact with a mold, and curing the curable composition. Such film forming technique is applied to an imprint technique and a planarization technique. In the imprint technique, by using a mold having a pattern, the pattern of the mold is transferred to a curable composition on a substrate by bringing the curable composition on the substrate into contact with the pattern of the mold and curing the curable composition. In the planarization technique, by using a mold having a flat surface, a film having a flat upper surface is formed by bringing a curable composition on a substrate into contact with the flat surface and curing the curable composition.

The curable composition is arranged in the form of droplets on the substrate, and the mold is then pressed against the droplets of the curable composition. This spreads the droplets of the curable composition on the substrate, thereby forming a film of the curable composition. At this time, it is important to form a film of the curable composition with a uniform thickness and not to leave bubbles in the film. To achieve this, the arrangement of the droplets of the curable composition, a method and a condition for pressing the mold against the curable composition, and the like are adjusted. To implement this adjustment operation by trial and error using an apparatus, enormous time and cost are required. To cope with this, development of a simulator that supports such adjustment operation is desired.

Japanese Patent No. 5599356 discloses a simulation method for predicting wet spreading and gathering (merging of droplets) of a plurality of droplets arranged on a pattern forming surface. In this simulation method, an analysis surface obtained by modeling the pattern forming surface is divided into a plurality of analysis cells, and a droplet is arranged for each drop site on the analysis surface. Japanese Patent No. 5599356 describes that the drop sites are defined as regions obtained by dividing the surface into an m×n grid pattern, and are based on a concept different from that of the analysis cells.

Normally, when the behaviors of droplets are calculated, it is necessary to define calculation components (analysis cells) each sufficiently smaller than the dimensions (size) of each droplet. However, calculation of the behaviors of droplets over the entire wide region such as one shot region while defining such small calculation components is extremely unrealistic, and it may be impossible to obtain a calculation result within an allowable time.

SUMMARY OF THE INVENTION

The present invention provides a technique advantageous in measuring the behavior of a curable composition in a process of forming a film of the curable composition within a shorter time.

According to one aspect of the present invention, there is provided a simulation method of predicting a behavior of a curable composition in a process of bringing a plurality of droplets of the curable composition arranged on a first member into contact with a second member and forming a film of the curable composition in a space between the first member and the second member, wherein for each of the plurality of droplets of the curable composition, a contour of the droplet is defined by a representative point of the droplet, a direction from the representative point to a point on the contour, and a distance from the representative point to the point on contour, and for each of the plurality of droplets of the curable composition, the distance from the representative point to the point on the contour is obtained so as to match the area of the inner region of the contour to an area of the droplet obtained from a volume of the droplet and a distance between the first member and the second member in accordance with a change of the distance between the first member and the second member.

Further features of the present invention will become apparent from the following description of exemplary embodiments with reference to the attached drawings.

DESCRIPTION OF THE EMBODIMENTS

Figure 1:
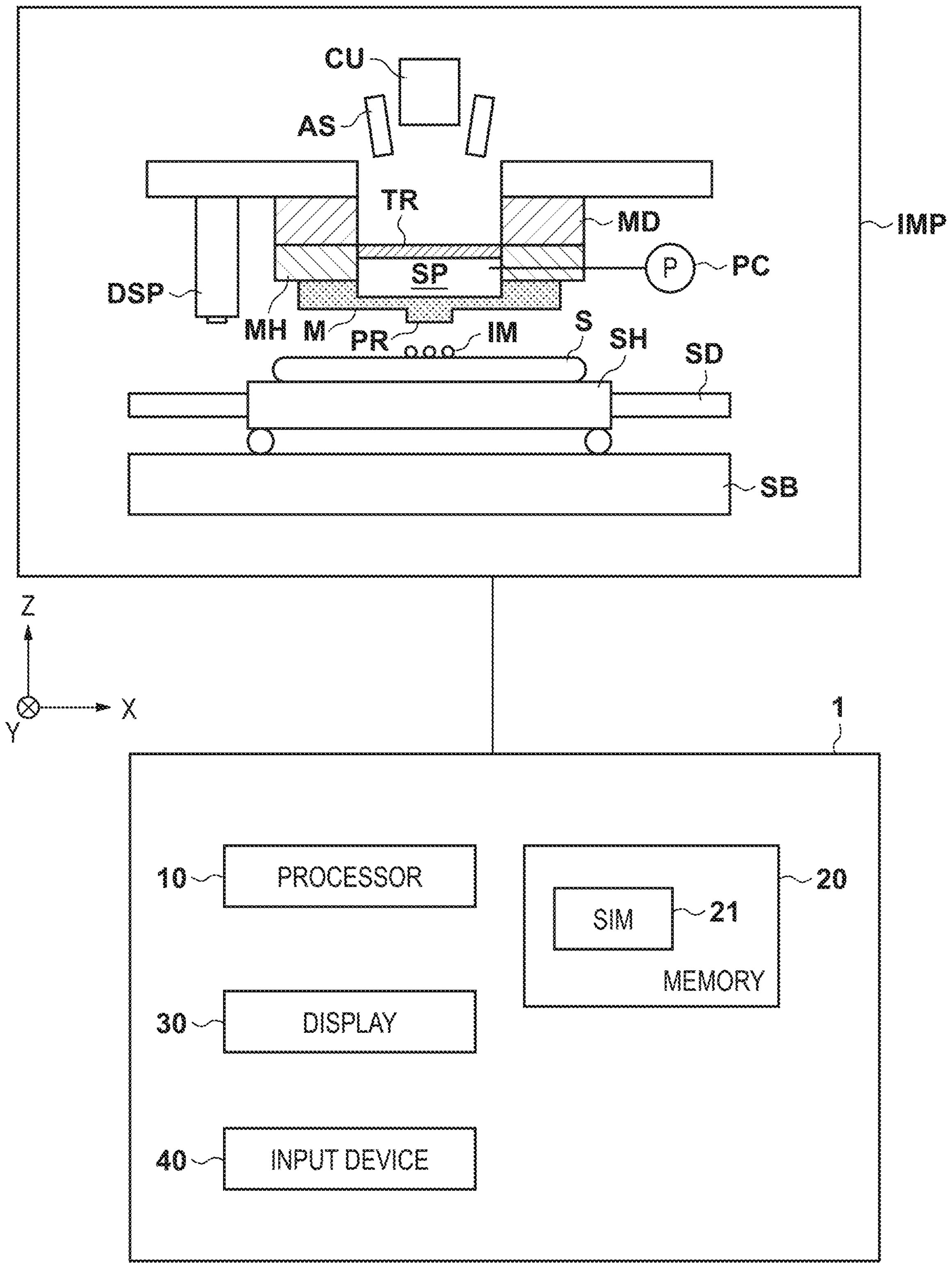
FIG. 1 is a schematic view showing the arrangements of a film forming apparatus and a simulation apparatus according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

FIG. 1 is a schematic view showing the arrangements of a film forming apparatus IMP and a simulation apparatus 1 according to an embodiment of the present invention. The film forming apparatus IMP executes a process of bringing a plurality of droplets of a curable composition IM arranged on a substrate S into contact with a mold M and forming a film of the curable composition IM in a space between the substrate S and the mold M. The film forming apparatus IMP may be formed as, for example, an imprint apparatus or a planarization apparatus. The substrate S and the mold M are interchangeable, and a film of the curable composition IM may be formed in the space between the mold M and the substrate S by bringing a plurality of droplets of the curable composition IM arranged on the mold M into contact with the substrate S. Therefore, the film forming apparatus IMP is comprehensively an apparatus that executes a process of bringing a plurality of droplets of the curable composition IM arranged on the first member into contact with the second member and forming a film of the curable composition IM in a space between the first member and the second member. This embodiment provides a description by assuming the first member as the substrate S and the second member as the mold M. However, the first member may be assumed as the mold M and the second member may be assumed as the substrate S. In this case, the substrate S and the mold M in the following description are interchanged.

The imprint apparatus uses the mold M having a pattern to transfer the pattern of the mold M to the curable composition IM on the substrate S. The imprint apparatus uses the mold M having a pattern region PR provided with a pattern. The imprint apparatus brings the curable composition IM on the substrate S into contact with the pattern region PR of the mold M, fills, with the curable composition IM, a space between the mold M and a region where the pattern of the substrate S is to be formed, and then cures the curable composition IM. This transfers the pattern of the pattern region PR of the mold M to the curable composition IM on the substrate S. For example, the imprint apparatus forms a pattern made of a cured product of the curable composition IM in each of a plurality of shot regions of the substrate S.

Using the mold M having a flat surface, the planarization apparatus brings the curable composition IM on the substrate S into contact with the flat surface of the mold M, and cures the curable composition IM, thereby forming a film having a flat upper surface. If the mold M having dimensions (size) that cover the entire region of the substrate S is used, the planarization apparatus forms a film made of a cured product of the curable composition IM on the entire region of the substrate S.

As the curable composition, a material to be cured by receiving curing energy is used. As the curing energy, an electromagnetic wave or heat can be used. The electromagnetic wave includes, for example, light selected from the wavelength range of 10 nm (inclusive) to 1 mm (inclusive) and, more specifically, infrared light, a visible light beam, or ultraviolet light. The curable composition is a composition cured by light irradiation or heating. A photo-curable composition cured by light irradiation contains at least a polymerizable compound and a photopolymerization initiator, and may further contain a nonpolymerizable compound or a solvent, as needed. The nonpolymerizable compound is at least one material selected from the group consisting of a sensitizer, a hydrogen donor, an internal mold release agent, a surfactant, an antioxidant, and a polymer component. The viscosity (the viscosity at 25° C.) of the curable composition is, for example, 1 mPa·s (inclusive) to 100 mPa·s (inclusive).

As the material of the substrate, for example, glass, a ceramic, a metal, a semiconductor, a resin, or the like is used. A member made of a material different from the substrate may be provided on the surface of the substrate, as needed. The substrate includes, for example, a silicon wafer, a compound semiconductor wafer, or silica glass.

In the specification and the accompanying drawings, directions will be indicated on an XYZ coordinate system in which directions parallel to the surface of the substrate S are defined as the X-Y plane. Directions parallel to the X-axis, the Y-axis, and the Z-axis of the XYZ coordinate system are the X direction, the Y direction, and the Z direction, respectively. A rotation about the X-axis, a rotation about the Y-axis, and a rotation about the Z-axis are θX, θY, and θZ, respectively. Control or driving concerning the X-axis, the Y-axis, and the Z-axis means control or driving concerning a direction parallel to the X-axis, a direction parallel to the Y-axis, and a direction parallel to the Z-axis, respectively. In addition, control or driving concerning the θX-axis, the θY-axis, and the θZ-axis means control or driving concerning a rotation about an axis parallel to the X-axis, a rotation about an axis parallel to the Y-axis, and a rotation about an axis parallel to the Z-axis, respectively. In addition, a position is information that is specified based on coordinates on the X-, Y-, and Z-axes, and an orientation is information that is specified by values on the θX-, θY-, and θZ-axes. Positioning means controlling the position and/or orientation.

The film forming apparatus IMP includes a substrate holder SH that holds the substrate S, a substrate driving mechanism SD that moves the substrate S by driving the substrate holder SH, and a base SB that supports the substrate driving mechanism SD. In addition, the film forming apparatus IMP includes a mold holder MH that holds the mold M and a mold driving mechanism MD that moves the mold M by driving the mold holder MH.

The substrate driving mechanism SD and the mold driving mechanism MD form a relative movement mechanism that moves at least one of the substrate S and the mold M so as to adjust the relative position between the substrate S and the mold M. Adjustment of the relative position between the substrate S and the mold M by the relative movement mechanism includes driving to bring the curable composition IM on the substrate S into contact with the mold M and driving to separate the mold M from the cured curable composition IM on the substrate S. In addition, adjustment of the relative position between the substrate S and the mold M by the relative movement mechanism includes positioning between the substrate S and the mold M. The substrate driving mechanism SD is configured to drive the substrate S with respect to a plurality of axes (for example, three axes including the X-axis, Y-axis, and θZ-axis, and preferably six axes including the X-axis, Y-axis, Z-axis, θX-axis, θY-axis, and θZ-axis). The mold driving mechanism MD is configured to drive the mold M with respect to a plurality of axes (for example, three axes including the Z-axis, θX-axis, and θY-axis, and preferably six axes including the X-axis, Y-axis, Z-axis, θX-axis, θY-axis, and θZ-axis).

The film forming apparatus IMP includes a curing unit CU for curing the curable composition IM with which the space between the substrate S and the mold M is filled. For example, the curing unit CU cures the curable composition IM on the substrate S by applying the curing energy to the curable composition IM via the mold M.

The film forming apparatus IMP includes a transmissive member TR for forming a space SP on the rear side (the opposite side of a surface opposing the substrate S) of the mold M. The transmissive member TR is made of a material that transmits the curing energy from the curing unit CU, and can apply the curing energy to the curable composition IM on the substrate S.

The film forming apparatus IMP includes a pressure control unit PC that controls deformation of the mold M in the Z-axis direction by controlling the pressure of the space SP. For example, when the pressure control unit PC makes the pressure of the space SP higher than the atmospheric pressure, the mold M is deformed in a convex shape toward the substrate S.

The film forming apparatus IMP includes a dispenser DSP for arranging, supplying, or distributing the curable composition IM on the substrate S. However, the substrate S on which the curable composition IM is arranged by another apparatus may be supplied (loaded) to the film forming apparatus IMP. In this case, the film forming apparatus IMP need not include the dispenser DSP.

The film forming apparatus IMP may include an alignment scope AS for measuring a positional shift (alignment error) between the substrate S (or the shot region of the substrate S) and the mold M.

The simulation apparatus 1 executes calculation of predicting the behavior of the curable composition IM in a process executed by the film forming apparatus IMP. More specifically, the simulation apparatus 1 executes calculation of predicting the behavior of the curable composition IM in the process of bringing the plurality of droplets of the curable composition IM arranged on the substrate S into contact with the mold M and forming a film of the curable composition IM in the space between the substrate S and the mold M.

The simulation apparatus 1 is formed by, for example, incorporating a simulation program 21 in a general-purpose or dedicated computer. Note that the simulation apparatus 1 may be formed by a PLD (Programmable Logic Device) such as an FPGA (Field Programmable Gate Array). Alternatively, the simulation apparatus 1 may be formed by an ASIC (Application Specific Integrated Circuit).

In this embodiment, the simulation apparatus 1 is formed by storing the simulation program 21 in a memory 20 in a computer including a processor 10, the memory 20, a display 30, and an input device 40. The memory 20 may be a semiconductor memory, a disk such as a hard disk, or a memory of another form. The simulation program 21 may be stored in a computer-readable memory medium or provided to the simulation apparatus 1 via a communication facility such as a telecommunication network.

Figure 2:
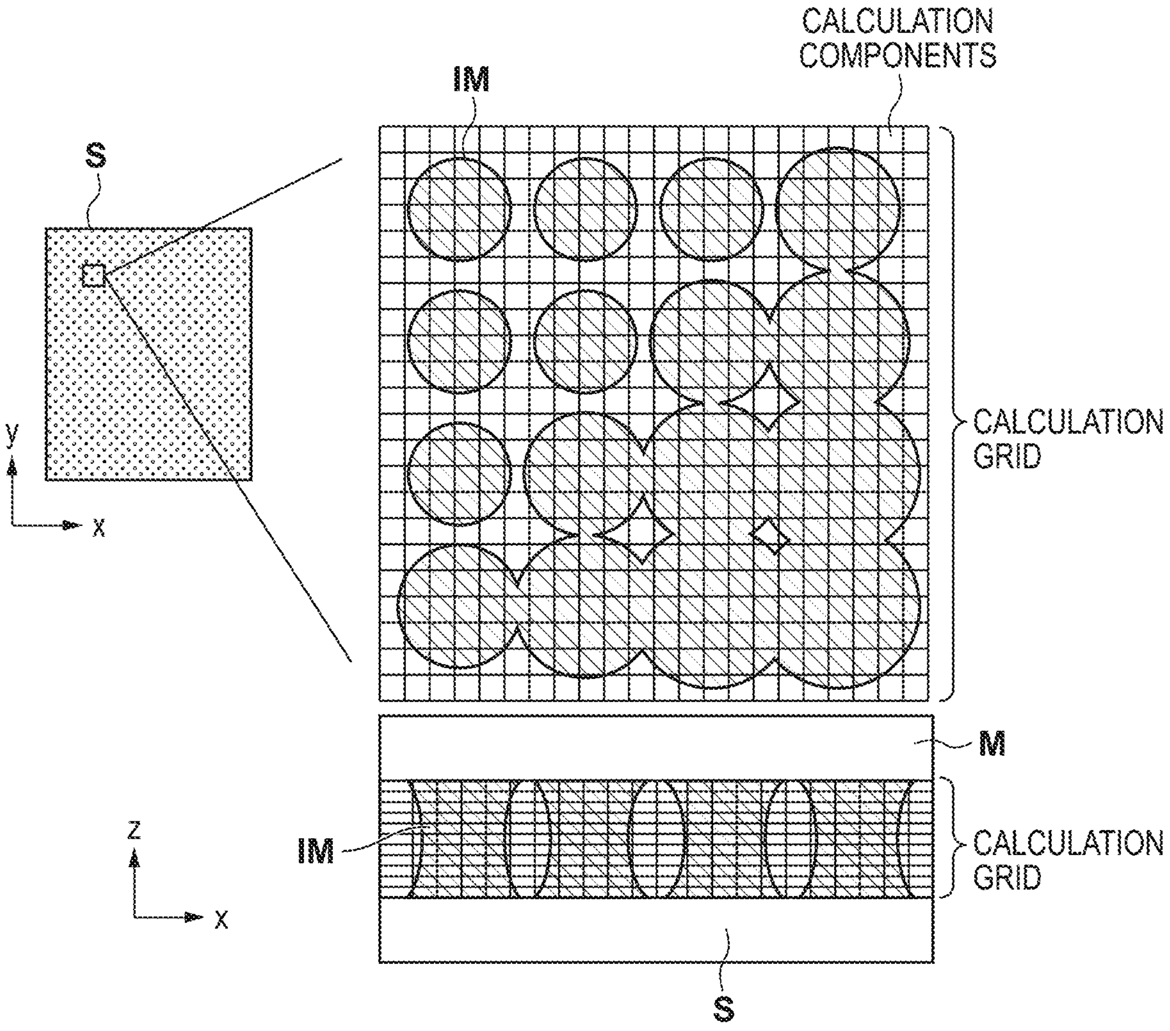
FIG. 2 is a view exemplifying a calculation grid in a general method.

FIG. 2 is a view exemplifying a calculation grid defined when simulating the behavior of the curable composition IM in the space between the substrate S and the mold M in a general method. In the general method, the calculation grid is an aggregate of calculation components as minimum units for calculation. Referring to FIG. 2, each of a plurality of small rectangles arranged to form a grid is a calculation component. A calculation grid is defined in an analysis target region, for example, a shot region of the substrate S. In the general method, to analyze the behaviors of droplets of the curable composition IM, a calculation grid formed by calculation components each sufficiently smaller than the dimensions of each droplet of the curable composition IM is defined, and the ratio of the volume of each droplet of the curable composition IM to the volume of each calculation component is represented. Consider, for example, a case in which a liquid film of the curable composition having a film thickness of around several ten nm is formed by arranging several-PL droplets in a region of 26 mm×33 mm as the standard angle of view in semiconductor manufacturing. In this case, several tens of thousands of droplets are dealt with at the same time. Therefore, if a calculation grid formed by such small calculation components is defined, the calculation amount is enormous, and it cannot be expected to obtain a calculation result within an allowable time.

It is required that there is no bubble (defect) in the film of the curable composition IM finally formed in the space between the substrate S and the mold M. To simulate the presence/absence of a bubble in the curable composition IM, it is necessary to correctly track the behaviors of the droplets when a bubble is confined among the droplets of the curable composition IM. In the general method, as shown in FIG. 2, the shapes of the droplets of the curable composition IM are represented as the distribution of volume fractions of the droplets with respect to the calculation components. Therefore, to accurately calculate merging of adjacent droplets, it is necessary to define very small calculation components that can sufficiently represent (resolve) the contours of the droplets, leading to an increase in calculation cost. Considering a case in which such calculation is performed for one entire shot region, it cannot be expected to obtain a calculation result within an allowable time.

Figure 3:
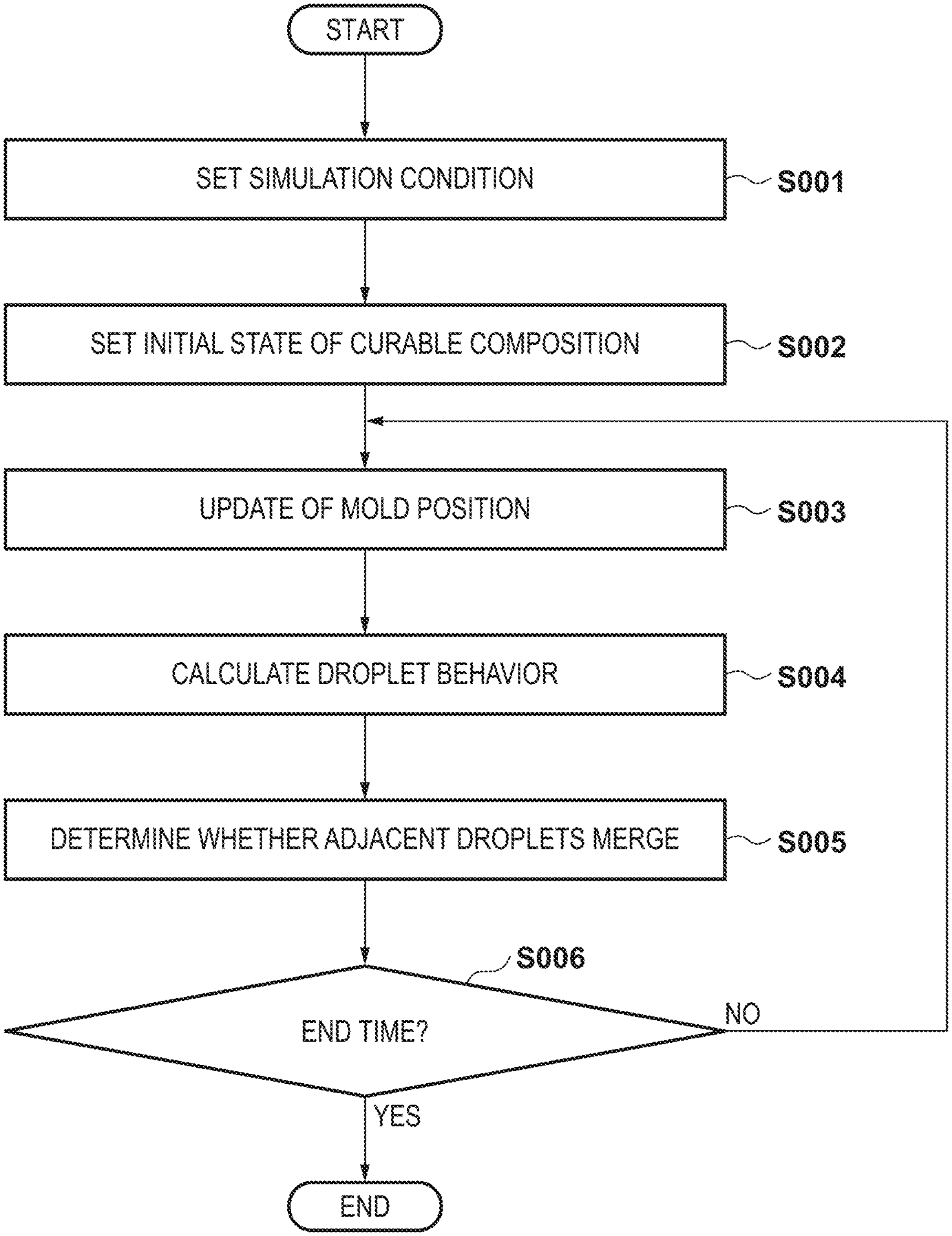
FIG. 3 is a flowchart for explaining a simulation method according to one aspect of the present invention.

A simulation method executed by the simulation apparatus 1 will be described with reference to FIG. 3. This simulation method includes steps S001, S002, S003, S004, S005, and S006. Step S001 is a step of setting a condition (simulation condition) necessary for simulation. Step S002 is a step of setting the initial state of the curable composition IM based on the simulation condition set in step S001. Steps S001 and S002 may be understood as one step obtained by combining steps S001 and S002, for example, as a preparation step. Step S003 is a step of updating (calculating) the position of the mold M (the distance between the substrate S and the mold M) by calculating the motion of the mold M. In step S004, for each of the plurality of droplets of the curable composition IM, the behavior (flow) of the droplet pressed and spread by the mold M is calculated based on the position of the mold M updated in step S003. Step S005 is a step of determining, based on the behaviors of the droplets calculated in step S004, whether adjacent droplets among the plurality of droplets of the curable composition IM merge with each other. In step S006, it is determined whether the time in calculation (simulation) has reached an end time. If the time in calculation has not reached the end time, the time advances to a next time, and the process shifts to step S003; otherwise, the simulation method ends. The simulation apparatus 1 may be understood as an aggregate of hardware components that execute steps S001, S002, S003, S004, S005, and S006, respectively.

Steps S001, S002, S003, S004, S005, and S006 will be described in detail below.

In step S001, various parameters are set as a condition necessary for simulation. The parameters include the arrangement of the droplets of the curable composition IM on the substrate S, the volume of each droplet, the physical properties of the curable composition IM, information concerning unevenness (for example, information of the pattern of the pattern region PR) of the surface of the mold M, and information concerning unevenness of the surface of the substrate S. The parameters include a time profile of a force applied to the mold M by the mold driving mechanism MD, and a profile of a pressure applied to the space SP (mold M) by the pressure control unit PC.

In step S002, the initial state of each of the plurality of droplets of the curable composition IM is set. The initial state includes the contour (the shape thereof) and height of each droplet when each droplet of the curable composition IM arranged on the substrate S is wet-spread. It is possible to calculate the initial state by assuming a static balanced state using the physical properties of the curable composition IM. It is also possible to calculate the initial state from a dynamic wet spreading behavior by executing a general fluid simulation by receiving an elapsed time since arrangement of the droplet of the curable composition IM on the substrate S and the like in addition to the physical properties of the curable composition IM.

Figure 4:
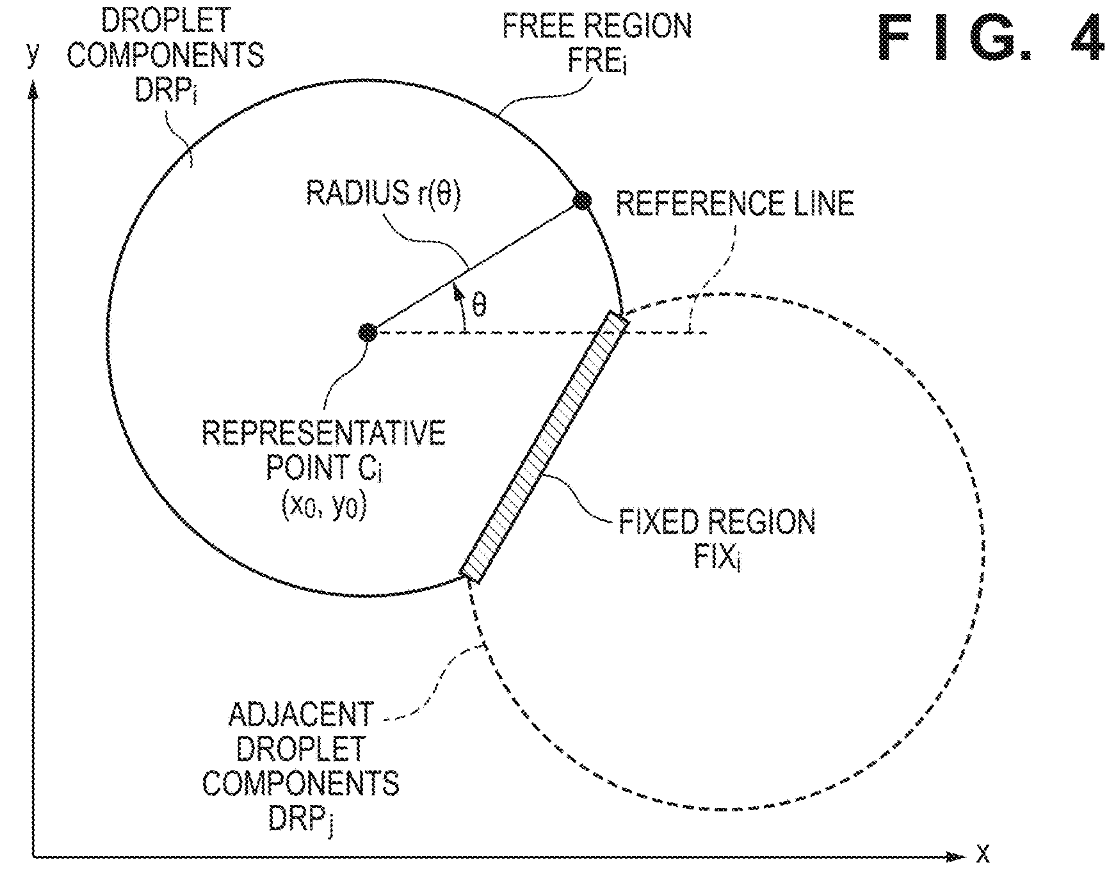
FIG. 4 is a view showing a concept of a droplet component of a curable composition.

In the simulation method according to this embodiment, each droplet of the curable composition IM is modeled as a droplet component DRP, as shown in FIG. 4. FIG. 4 is a view showing a concept of the droplet component DRP of the curable composition IM. Referring to FIG. 4, DRPi represents the ith droplet component in a calculation region. In the following description, a subscript i represents the number of the droplet component DRP.

A representative point is set within the droplet component of the curable composition IM. The coordinates of the representative point are represented by Ci(x0, y0). The representative point of the droplet component of the curable composition IM may be set at the barycenter of the droplet or a point (position) different from the barycenter of the droplet but needs to be set inside the contour of the droplet. In addition, a reference line defined by a straight line passing through the representative point of the droplet component of the curable composition IM is set. Then, a distance from the representative point of the droplet component of the curable composition IM to a point on the contour (periphery) of the droplet component at a position at an angle θ (an angle formed by the reference line and a line connecting the representative point and the point on the contour of the droplet) is represented as a radius r(θ). The radius r(θ) has a different value for each angle θ. Information indicating whether each point on the contour of the droplet component merges with an adjacent droplet component is held together. The position of the point on the contour that merges with the adjacent droplet component is fixed at this time. In other words, with respect to the droplet merging with the adjacent droplet, among the plurality of droplets of the curable composition IM, the distance, from the representative point to the point on the contour, corresponding to the merging portion of the droplet, that is, the radius r(θ) is fixed. As indicated by a thick line in FIG. 4, a region of the angle θ at which the radius r(θ) is fixed is set as a fixed region $FIX_i$. On the other hand, as indicated by a solid line in FIG. 4, a region of the angle θ at which the radius r(θ) is not fixed is set as a free region $FRE_i$. In the initial state of the droplet of the curable composition IM, all the angles θ belong to the free region.

Figure 5:
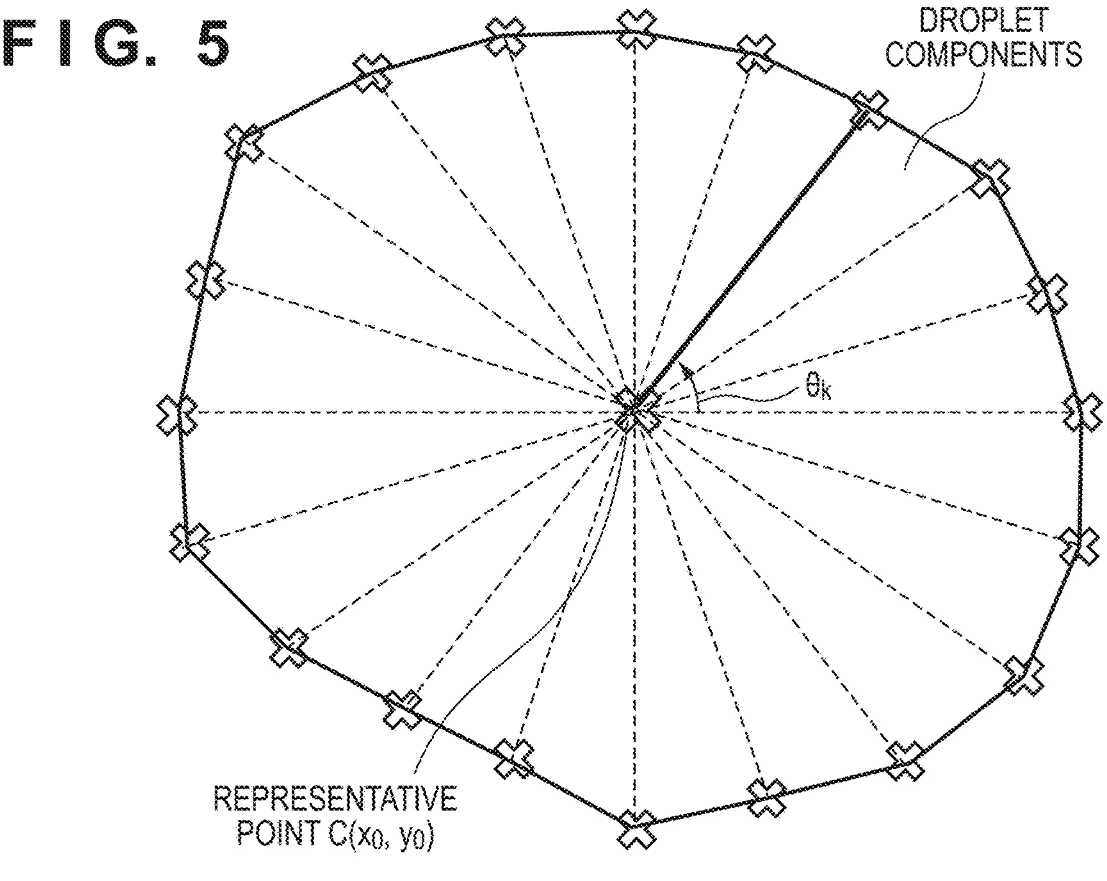
FIG. 5 is a view showing the droplet component of the curable composition defined by 20 angles.

When the simulation method according to this embodiment is implemented as an actual program, it is considered that a finite number of divided angles θ are dealt with (that is, to define the contour of the droplet, the finite number of points are set on the contour of the droplet). FIG. 5 is a view showing the droplet component of the curable composition IM defined (divided) by 20 angles $\theta_k$ (k=1 to 20). At this time, the angles $\theta_k$ may be set by equally dividing 360° or may be set to arbitrary angles. When obtaining a contour between adjacent points on the contour of the droplet component represented by the finite number of angles, arbitrary interpolation can be applied. For example, the adjacent points on the contour may be connected by a line or higher-order interpolation can be applied.

Figure 6:
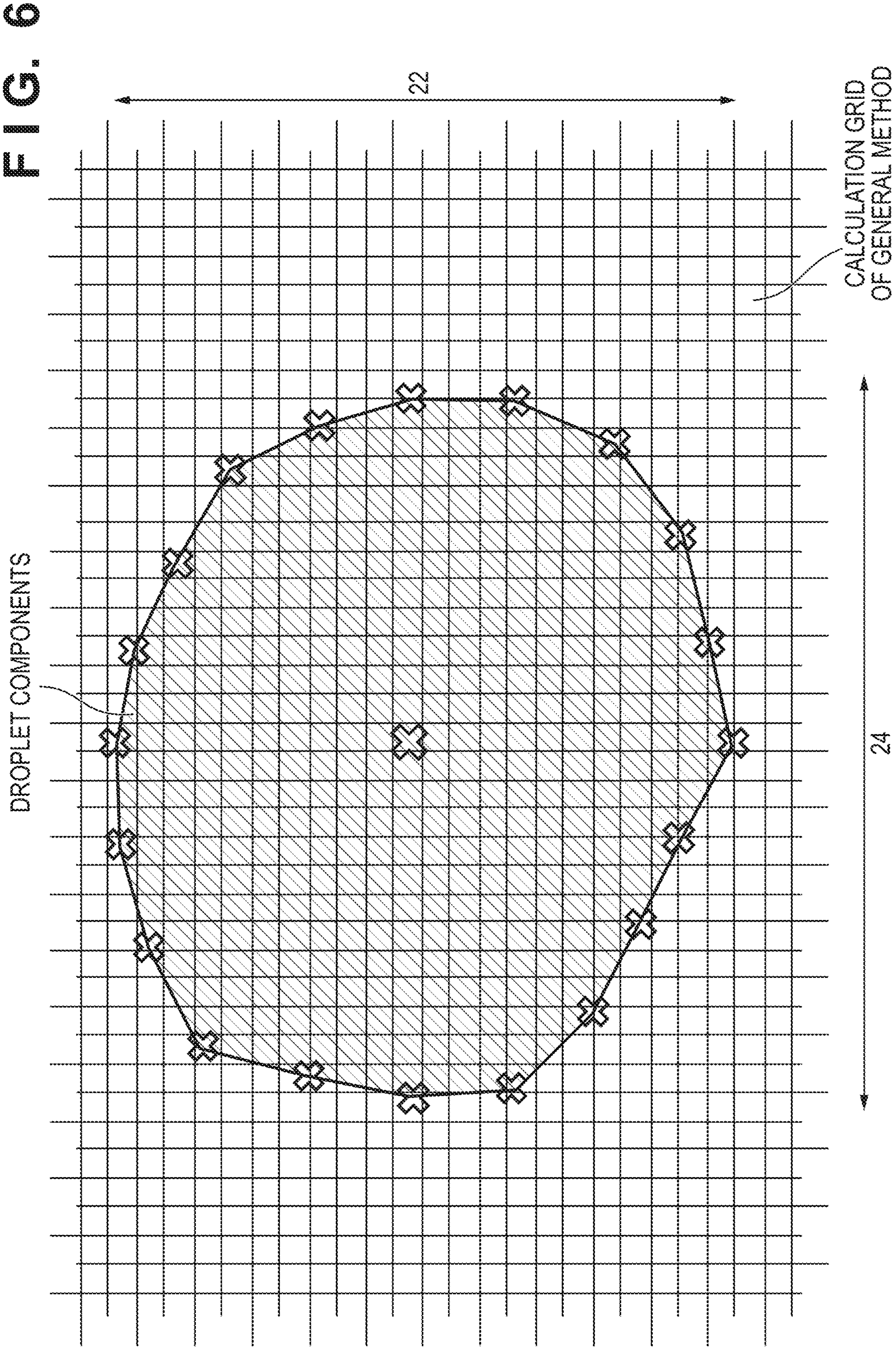
FIG. 6 is a view exemplifying a calculation grid in the general method.

As described above, in this embodiment, it is also possible to accurately represent the contours (shapes) between the finite number of points on the contour of the droplet component of the curable composition IM. On the other hand, in the general method (conventional technique) of defining the calculation grid, to make the representation accuracy of the contour of the droplet component equal to that in this embodiment, many calculation components are required, as shown in FIG. 6. More specifically, when it is considered that the droplet component shown in FIG. 5 is represented on the calculation grid, at least 24×22 (=528) calculation components are required, and it is thus necessary to store pieces of information, the number of which is equal to that of calculation components. To the contrary, in this embodiment, it is possible to represent the droplet component of the curable composition IM by 20 pieces of information. In fact, it is necessary to simultaneously deal with the plurality of droplets of the curable composition IM, thereby increasing the difference between this embodiment and the general method. In this embodiment, an information amount proportional to the number of droplets need only be dealt with. However, in the general method, it is also necessary to set calculation components in regions between droplets, and thus more calculation grids are required, leading to an increase in calculation time. As described above, this embodiment can represent the contour of the droplet of the curable composition IM with a significantly low calculation cost, as compared with the general method of defining the calculation grid.

In step S003, the motion of the mold M is calculated and the position of the mold M is updated. The motion of the mold M is calculated by dynamics calculation in consideration of a force generated when the droplets of the curable composition IM or a liquid film in which the droplets merge with each other is crushed, a force caused by the flow of gas, a load applied to the mold M, the influence of elastic deformation of the mold M, and the like. In addition, the position of the mold M corresponding to the current time may be updated using the position of the mold M which corresponds to each time in calculation and is obtained in advance.

In the general method of defining the calculation grid, it is necessary to solve an equation concerning the flow of the droplets to calculate spreading of the droplets of the curable composition IM arranged on the substrate S. The equation concerning the flow of the droplets of the curable composition IM is generally simultaneous equations for all the calculation components. Therefore, if calculation components (size) that can accurately determine merging of the droplets of the curable composition IM are used, the calculation cost becomes enormous. Thus, it cannot be expected to obtain a calculation result within a realistic time.

To solve this problem, unlike the general method, this embodiment proposes a method of calculating the behaviors of the droplets without solving the equations (simultaneous equations) concerning the flow of the droplets of the curable composition IM, thereby attempting to largely reduce the calculation cost and obtain calculation accuracy.

In step S004, the behavior of the droplet component DRP pressed and spread by the mold M is calculated. Step S004 includes a step of determining whether the droplet component DRP contacts the mold M. If a height $h_{drp,i}$ of the droplet component $DRP_i$ obtained in step S002 is compared with a distance $h_i$ between the mold M and the substrate S at the representative point (x0, y0) of the droplet component $DRP_i$, and expression (1) below is satisfied, it is determined that the droplet component $DRP_i$ contacts the mold M.

$$h_{drp,i} \leq h_i \quad (1)$$

On the other hand, if expression (1) is not satisfied, it is determined that the droplet component $DRP_i$ does not contact the mold M at the current time in calculation. In this case, the behavior of the droplet component $DRP_i$ is not calculated.

With respect to the droplet component $DRP_i$ determined to contact the mold M, a behavior of being pressed and spread by the motion of the mold M is calculated. In this step, the volume of the droplet of the curable composition IM is saved (maintained). Therefore, an area $S^{new}$ of the droplet component $DRP_i$ at the current time can be represented using a volume $V_i$ of the droplet component $DRP_i$ and the distance $h_i$ at the droplet component position at the current time by:

$$S^{new} = \frac{V_i}{h_i} \quad (2)$$

When $S^{old}$ represents the area of the droplet component $DRP_i$ at an immediately preceding time, the area of the droplet component $DRP_i$ changes by ΔS due to the motion of the mold M for a period from the immediately preceding time to the current time. Therefore, the change ΔS of the area of the droplet component $DRP_i$ is given by:

$$\Delta S = S^{new} - S^{old} \quad (3)$$

Figure 7:
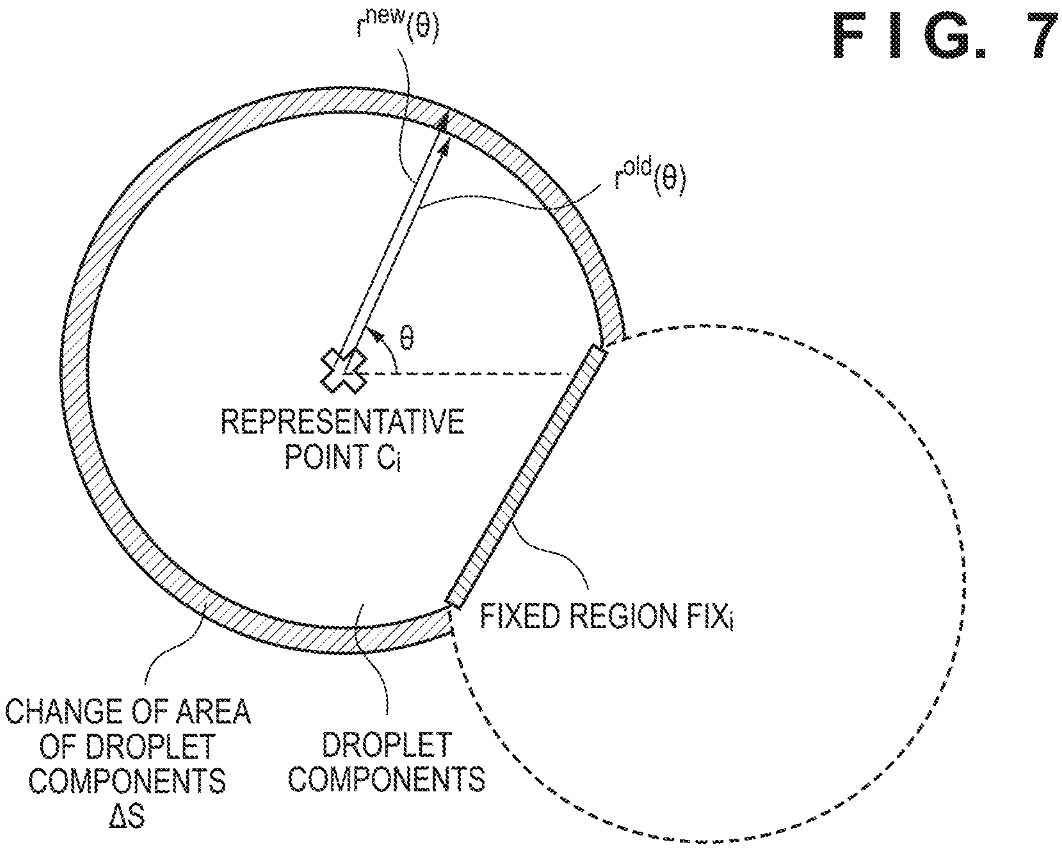
FIG. 7 is a view schematically showing a change of the area of the droplet component caused by the motion of a mold.

FIG. 7 is a view schematically showing the change ΔS of the area of the droplet component $DRP_i$ caused by the motion of the mold M.

On the other hand, an area S of the droplet component can be associated with the radius r(θ), as given by:

$$S = \int_0^{2\pi} \frac{1}{2} r^2 d\theta \quad (4)$$

Figure 8:
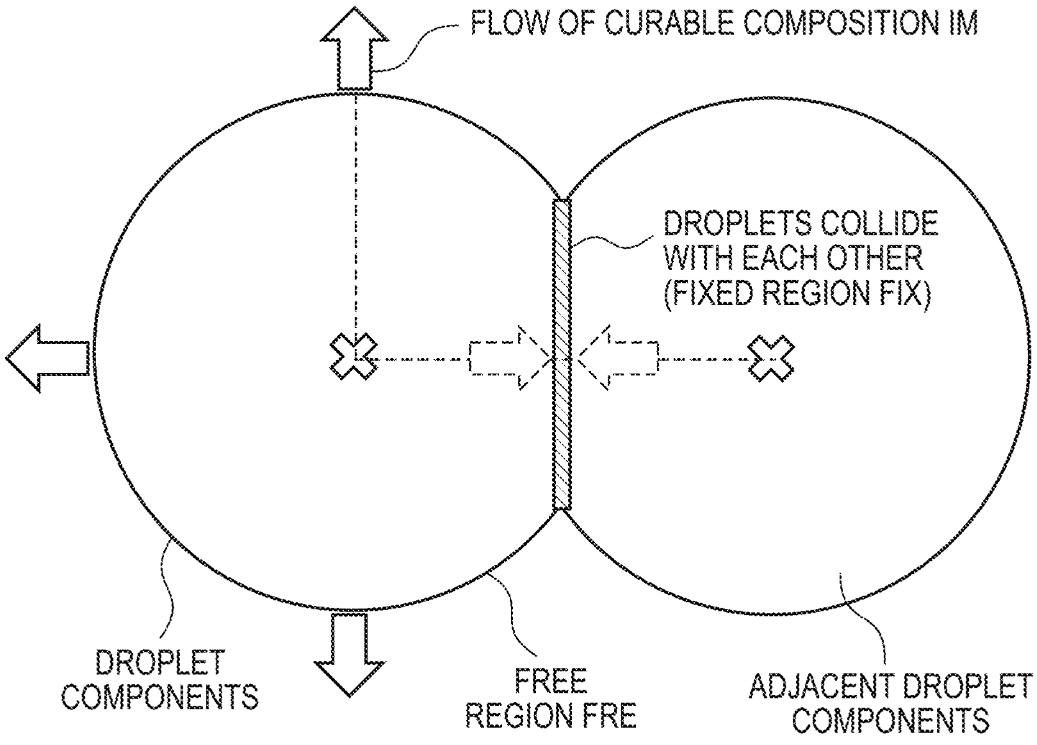
FIG. 8 is a view showing an example of spreading of droplet components.

In the simulation method according to this embodiment, spreading of the droplet component is represented by increase/decrease of the radius r(θ). With respect to a region (portion) where the droplet component merges with an adjacent droplet component, that is, an angle direction included in a fixed region FIX, the droplet component and the adjacent droplet component attempt to spread (the droplet components collide with each other), as shown in FIG. 8. In this case, spreading of the droplet component and that of the adjacent droplet component are canceled with each other, and it can be considered that the droplet components do not spread any more in the above-described angle direction. Therefore, the change ΔS of the area of the droplet component appears when the droplet component spreads in angle directions included in a free region FRE where the droplet component does not merge with the adjacent droplet.

Furthermore, since the interior of the droplet component is uniformly crushed by the mold M, it can be considered that the droplet component spreads in a uniform size in the angle directions belonging to the free region FRE. Therefore, the change ΔS of the area of the droplet component from the immediately preceding time can be given by:

$$\Delta S = S^{new} - S^{old} = \int_{FRE} r(\theta)\Delta r d\theta \quad (5)$$

where Δr represents a change (increment) of the radius r(θ), and has a common value for angles belonging to the free region FRE.

Figure 9:
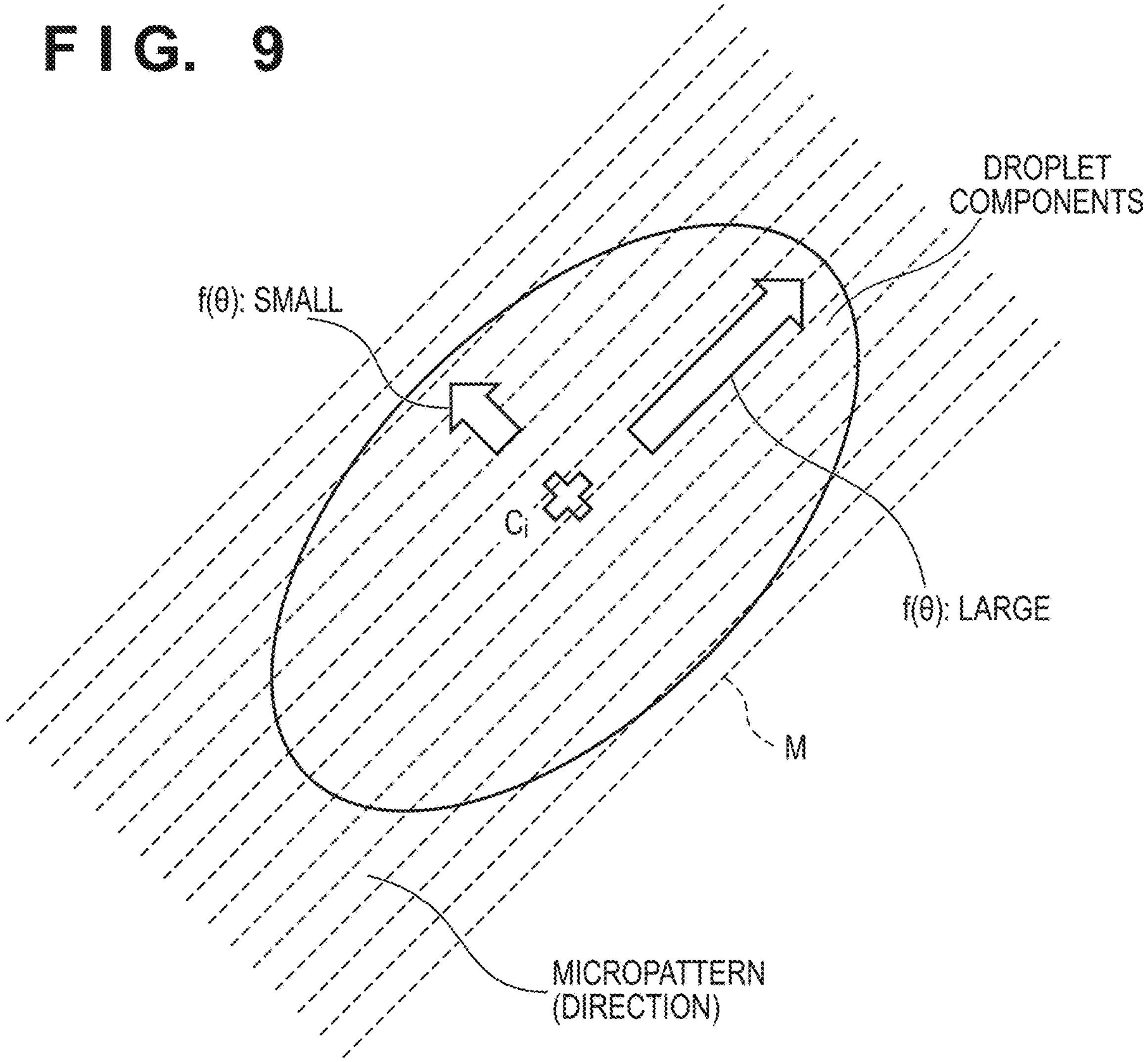
FIG. 9 is a view showing an example of spreading of a droplet component.

However, it is known that if an uneven structure exists in the substrate S or a micropattern is formed on the mold M, the droplet (droplet component) of the curable composition IM arranged on the substrate S anisotropically spreads, as shown in FIG. 9. In this case, a weighting function f(θ) representing anisotropy is introduced, and the change ΔS of the area of the droplet component is given by:

$$\Delta S = S^{new} - S^{old} = \int_{FRE} f(\theta) r(\theta)\Delta r d\theta \quad (6)$$

The weighting function f(θ) is calculated depending on the angle θ and a feature direction (for example, the direction of the micropattern) generated by the micropattern formed on the mold M and the like. Note that if the droplet (droplet component) of the curable composition IM arranged on the substrate S isotropically spreads, the weighting function f(θ) satisfies:

$$f(\theta) = 1 \quad (7)$$

The change Δr of the radius r(θ) can be obtained by:

$$\Delta r = \frac{S_0^{new} - S^{old}}{\int_{FRE} f(\theta) r(\theta) d\theta} \quad (8)$$

By using the thus obtained Δr of the radius r(θ), a radius $r^{new}(\theta)$ at the current time can be represented using a radius $r^{old}(\theta)$ at the immediately preceding time by:

$$r^{new}(\theta) = r^{old}(\theta) + f(\theta)\Delta r \text{ for } \theta \in FRE \quad (9)$$

As described above, for each of the plurality of droplets of the curable composition IM, the distance from the representative point of the droplet to a point on the contour is obtained so as to coincide with the area of the droplet obtained from the volume of the droplet and the distance between the mold M and the substrate S in accordance with the change of the distance between the mold M and the substrate S. Therefore, in the simulation method according to this embodiment, the behavior of the droplet can be represented (calculated) without solving the equation concerning the flow of the droplet of the curable composition IM.

In step S005, it is determined whether the adjacent droplet components merge with each other. As a result of calculating the contour of the droplet component in step S004, a point on the contour of the angle θ belonging to the free region FRE falls within the adjacent droplet component (inside the contour). In this case, the radius r(θ) at the angle θ is fixed (that is, the distance, from the representative point to the point on the contour, corresponding to the merging portion of the droplet is fixed). In other words, the angle θ is included in the fixed region FIX, and after this time, the droplet component of the curable composition IM does not spread (flow) in the direction of the angle θ. In step S005, for all the pairs of adjacent droplet components, it is determined whether the droplets merge with each other, as described above.

Figure 10:
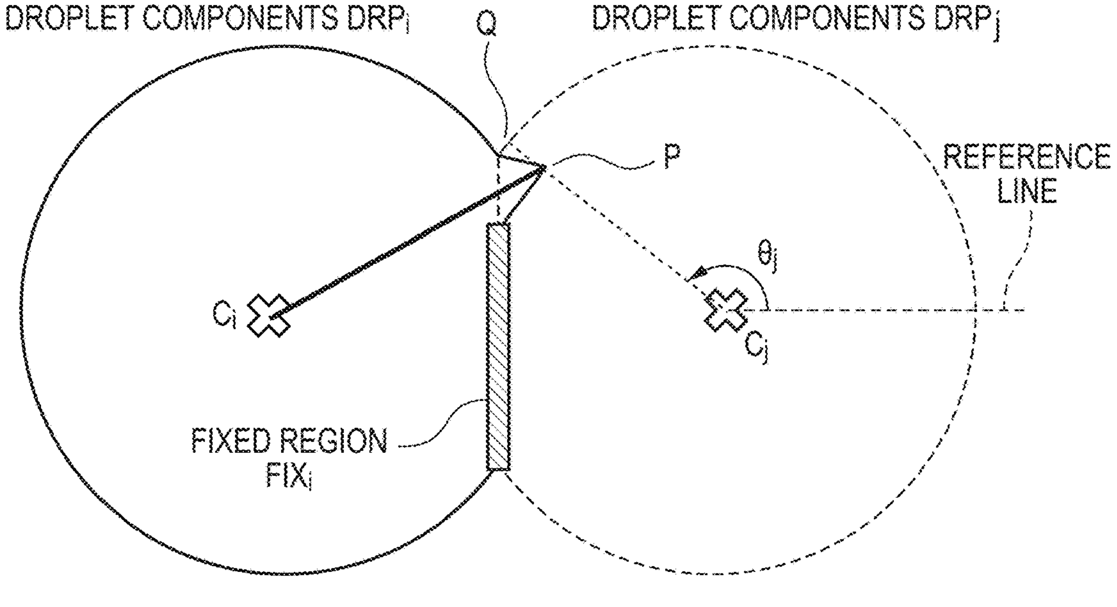
FIG. 10 is a view for explaining a process of determining whether adjacent droplet components merge with each other.

A process of determining whether the adjacent droplet components merge with each other, that is, whether a point on the contour of the droplet is located inside the contour of the adjacent droplet will be described with reference to FIG. 10. Consider a point P on a contour in an angle direction belonging to the free region $FRE_i$ of the droplet component $DRP_i$ by paying attention to the droplet component $DRP_i$ (first droplet). A droplet component adjacent to the droplet component $DRP_i$ is set as a droplet component $DRP_j$ (second droplet), and then the length of a line segment $PC_j$ connecting the point P and a representative point $C_j$ (center) of the droplet component $DRP_j$ is obtained. Furthermore, an angle $\theta_j$ formed by the line segment $PC_j$ and the reference line of the droplet component $DRP_j$ is obtained, and then the length of a radius $QC_j$ of the droplet component $DRP_j$ at the angle $\theta_j$ is obtained. If the length of the radius $QC_j$ is compared with that of the line segment $PC_j$, and the length of the radius $QC_j$ is longer than that of the line segment $PC_j$, it is determined that the point P on the contour of the droplet component $DRP_i$ is located inside the contour of the adjacent droplet component $DRP_j$, that is, the droplet components merge with each other. On the other hand, if the length of the radius $QC_j$ is shorter than that of the line segment $PC_j$, it is determined that the point P on the contour of the droplet component $DRP_i$ is not located inside the contour of the adjacent droplet component $DRP_j$, that is, the droplet components do not merge with each other. Note that FIG. 10 shows a state in which the point P on the contour of the droplet component $DRP_i$ largely intrudes inside the adjacent droplet component $DRP_j$. This emphasizes the feature of this embodiment. In actual calculation, by making a time interval sufficiently short, an intrusion amount by which the point P on the contour of the droplet component $DRP_i$ intrudes inside the adjacent droplet component $DRP_j$ can be decreased to a negligible amount.

Figure 11:
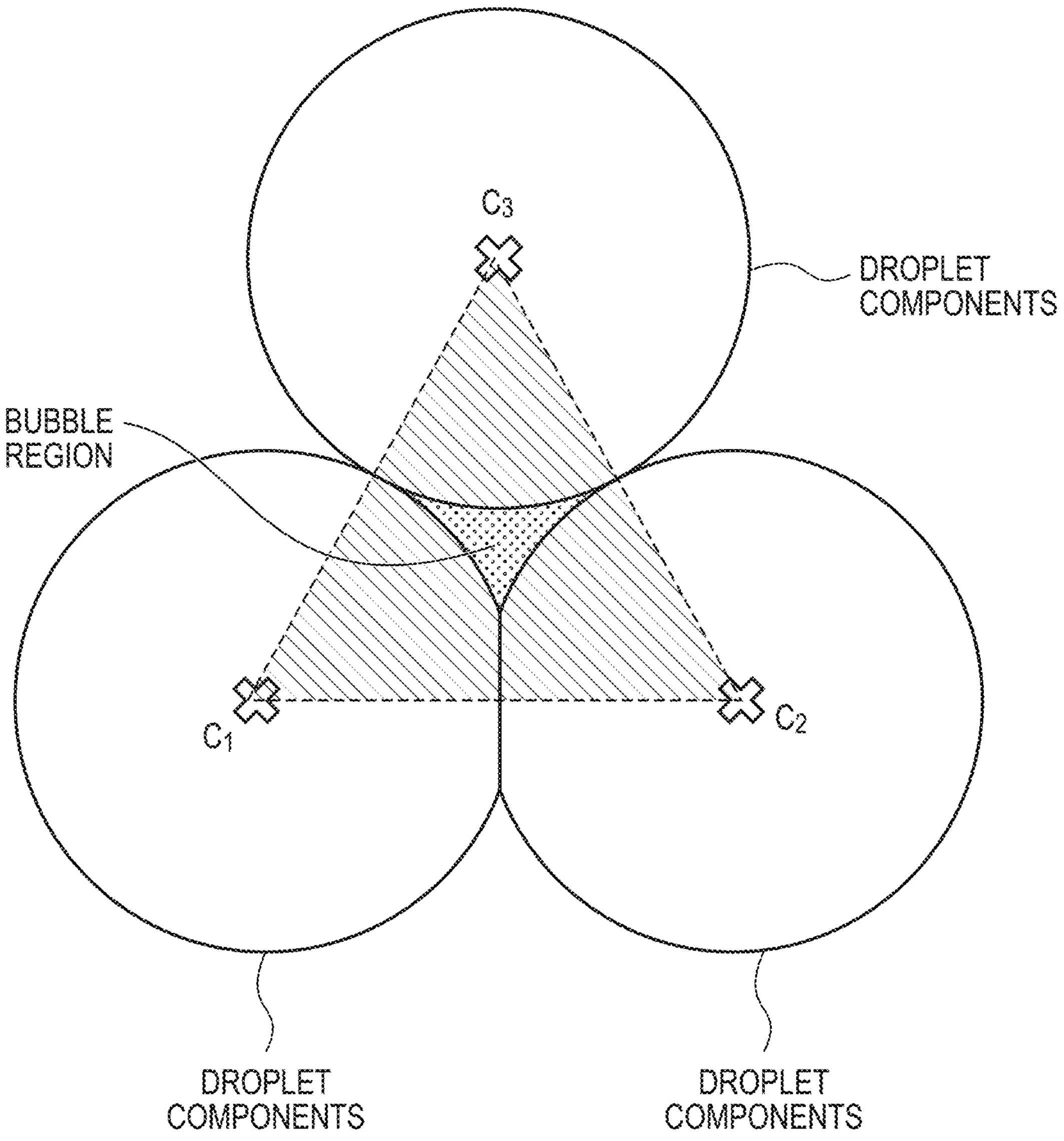
FIG. 11 is a view showing a state in which a bubble is confined due to merging of a plurality of droplet components.

If the fixed region FIXi is partially shared between the adjacent droplet components, the droplet components can be regarded to merge with each other. If a plurality of droplet components merge with each other, a bubble is confined in a region surrounded by the droplet components to form a bubble region, as shown in FIG. 11. FIG. 11 is a view showing a state in which a bubble is confined due to merging of the plurality of droplet components. As described above, in the simulation method according to this embodiment, it is possible to accurately grasp a timing at which a bubble is confined. In addition, it is possible to readily calculate the volume of the bubble confined in the region surrounded by the droplet components. More specifically, as shown in FIG. 11, it is possible to calculate the area of the bubble region by subtracting the hatched area of the droplet components from the area of a triangle $C_1C_2C_3$. It is also possible to calculate the volume of the bubble confined in the region surrounded by the droplet components by multiplying the area of the bubble region by the distance between the mold M and the substrate S at the time when the bubble is confined.

Figure 12:
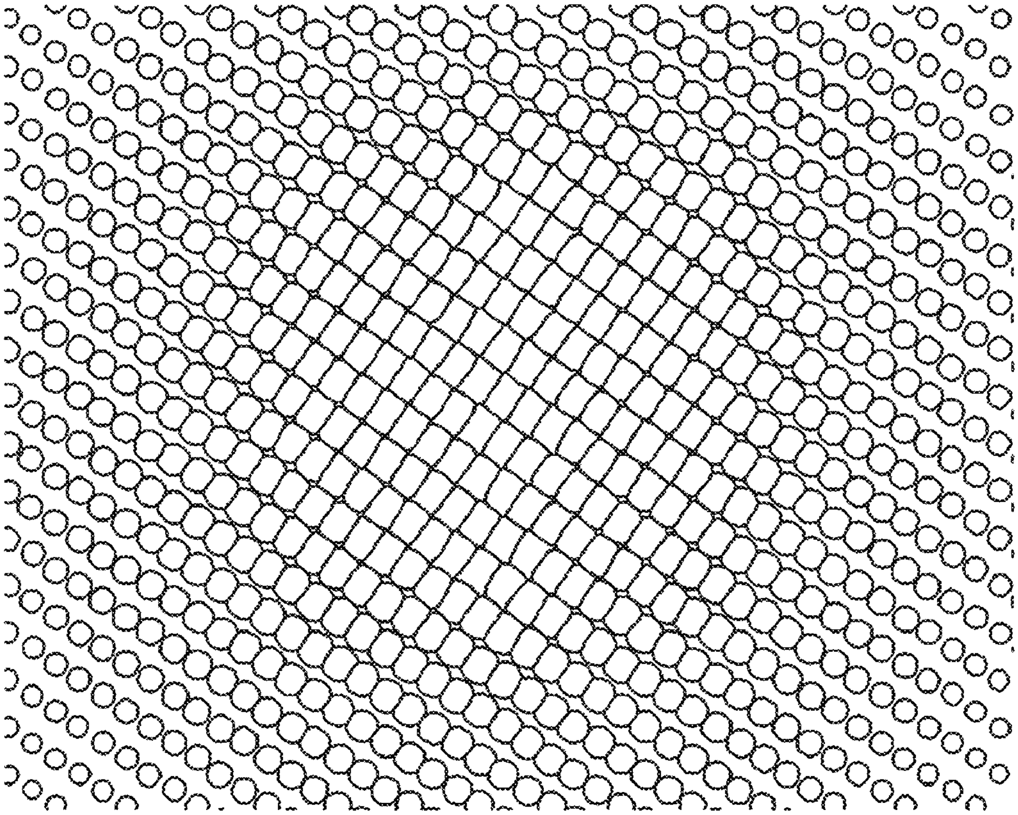
FIG. 12 is a view showing an example of calculating the behaviors of droplets of the curable composition by the simulation apparatus shown in FIG. 1.

FIG. 12 is a view showing an example of calculating the behaviors (spreading) of the droplets of the curable composition IM by the simulation apparatus 1 implementing the simulation method according to this embodiment. The distance between the mold M and the substrate S is shorter toward the center of FIG. 12, and is longer away from the center of FIG. 12. Referring to FIG. 12, it is apparent that the state of complicated merging of the droplets and the like can be represented in accordance with the arrangement of the droplets of the curable composition IM on the substrate S.

The calculation step including steps S003, S004, and S005 is executed for a plurality of preset times. For example, the plurality of times are arbitrarily set within a period from a time when the mold M starts to lower from the initial position until a time when the mold M contacts a plurality of droplets, the plurality of droplets are crushed to spread, and merge with each other to finally form one film, and the curable composition should be cured. The plurality of times are typically set at a predetermined time interval.

In step S006, it is determined whether the time in calculation has reached the end time. As described above, if the time in calculation has not reached the end time, the time advances to the next time, and the process shifts to step S003; otherwise, the simulation method ends. In an example, in step S006, the current time is advanced by a designated time step, thereby setting a new time. Then, if the new time has reached the end time, it is determined that calculation is complete.

The order of steps S003 to S005 may be changed. For example, if steps S004, S005, and S003 are executed in this order, the process can be performed in the same manner by setting the position of the mold M corresponding to the immediately preceding time as the position of the mold M to be used to calculate the behavior of each droplet of the curable composition IM.

As described above, according to this embodiment, a behavior in which the respective droplets of the curable composition IM arranged on the substrate S are pressed and spread by the mold M and merge with each other can be implemented with a very low calculation cost. Furthermore, it is possible to accurately calculate the volume of a bubble confined among droplets in the step of merging of the droplets of the curable composition IM.

Note that in the present embodiment, the point on the periphery is represented by the angle formed by the reference line passing through the representative point and the line connecting the representative point and the point on the periphery, and the length of the line connecting the representative point and the point on the periphery, but it is not limited to this. For example, the point on the periphery may be represented by another method, in which the direction and distance from the representative point to the point on the periphery can be known, such as use an angle formed by the x-axis or y-axis of the calculation space and an arbitrary reference line instead of the above angle, use a vector representation from the representative point toward the periphery or vice versa instead of the representation using the above angle and length, and use a coordinate set of the representative point and the point on the periphery.

The simulation method according to the present invention allows to predict a behavior of the curable composition under a film forming condition, in specific to predict occurrence or non-occurrence of bubbles in the film of the curable composition to be formed under simulated film forming conditions. As an aspect of using a film forming apparatus for forming a film, such simulation method can be used to determine or adjust one or more film forming conditions to be provided by the film forming apparatus for forming the film so as to suppress the occurrence of bubbles in the film to be formed. Such film forming method can be used for producing a cured product.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent application No. 2019-109021 filed on Jun. 11, 2019, which is hereby incorporated by reference herein in its entirety.

What is claimed is:

1. A computer-implemented method for designing a film forming condition to be used by a film forming apparatus that forms a film of a curable composition by bringing a plurality of droplets of the curable composition arranged on a first member into contact with a second member the method comprising:

acquiring, by a processor, information including at least arrangement information of the plurality of droplets and volume information of each droplet to be used in the design of the film-forming condition;

acquiring, by the processor, a distance between the first member and the second member to be used in the film forming process;

executing, by the processor, a simulation that, for each of the plurality of droplets of the curable composition, calculates a distance from a representative point inside the droplet to each of a plurality of points on a contour of the droplet at a predetermined timing based on the simulation information and the acquired distance between the first member and the second member;

determining, by the processor, for each of the plurality of droplets of the curable composition, whether one droplet among the plurality of droplets merges with an adjacent droplet at the predetermined timing based on a positional coordinate of the representative point inside the droplet, and the distances from the representative point inside the droplet to each of the plurality points on the contour of the droplet;

predicting, by the processor, at least one of a film thickness distribution or a bubble occurrence in a region on the first member based on a result obtained in the step of determining;

evaluating, by the processor, whether the predicted film thickness distribution satisfies a predetermined uniformity criterion;

when the uniformity criterion is not satisfied, automatically modifying, by the processor, at least one of the arrangement information or the distance between the first member and the second member, and repeating the simulation and the determining and the evaluating until the uniformity criterion is satisfied; and outputting, by the processor, a finalized film-forming condition including the arrangement information and the distance between the first member and the second member as a design result to be used by the film forming apparatus, setting, by the processor, a forming condition based on the finalized film-forming condition output by the step of outputting; and forming, by the processor, the film on the basis of the finalized film-forming condition set in the step of stepping, wherein in the step of determining whether one of droplets among the plurality of droplets merges with an adjacent droplet, it is determined that a first droplet and a second droplet adjacent to the first droplet among the plurality of droplets are merged at the predetermined timing, in case of at least one of the plurality of points on the contour of the first droplet is located inside an area of the second droplet, wherein at least each of the step of determining is performed multiple times during a period from a timing of bringing the first member and the second member into contact via the plurality of droplets of the curable composition to a timing of curing the film of the curable composition.

2. The method according to claim 1, wherein in the step of determining, in a case of any of the plurality of points on the contour of the first droplet is not located inside the contour of the second droplet, it is determined that the first droplet and the second droplet do not merge with each other.

3. The method according to claim 1, wherein the distance, from the representative point of the droplet which merge with the adjacent droplet to the point on the contour, corresponding to a merging portion of the droplet is fixed.

4. The method according to claim 1, further comprising:

interpolating the plurality of points on the contour of the droplet except for a finite number of points on the contour of the droplet are set to define the contour of the droplet using distances from the representative point to the finite number of points on the contour.

5. The method according to claim 1, wherein the plurality of points on the contour of the droplet except for a finite number of points on the contour are set to define the contour of the droplet are obtained by connecting the finite number of points.

6. The method according to claim 1, wherein a finite number of points on the contour of the droplet are set to define the contour of the droplet move in a predetermined direction until merging with the adjacent droplet in accordance with the change of the distance between the first member and the second member.

7. The method according to claim 1, wherein the predetermined timing is a timing within the period.

8. The method according to claim 7, wherein for the point defined on the contour of the first droplet determined to be located inside the area of the second droplet in the step of determining at a first timing of the period, at a second timing after the first timing, the distance is not calculated at least in the step of calculating.

9. The method according to claim 7, wherein the plurality of points are located on the contour of the droplet spread on the first member when the droplet is viewed from a direction that moves the first member and the second member to bring them into contact.

10. A system comprising a computer for designing a film-forming condition for a film forming apparatus that forms a film of a curable composition by bringing a plurality of droplets of the curable composition arranged on a first member into contact with a second member, wherein the computer comprises:

a processor connected to a memory, the processor being configured read a program in the memory to perform the steps of:

acquiring, by a processor, information including at least arrangement information of the plurality of droplets and volume information of each droplet to be used in the design of the film-forming condition;

acquiring, by the processor, a distance between the first member and the second member to be used in the film forming process;

executing, by the processor, a simulation that, for each of the plurality of droplets of the curable composition, calculates a distance from a representative point inside the droplet to each of a plurality of points on a contour of the droplet at a predetermined timing based on the simulation information and the acquired distance between the first member and the second member;

determining, by the processor, for each of the plurality of droplets of the curable composition, whether one droplet among the plurality of droplets merges with an adjacent droplet at the predetermined timing based on a positional coordinate of the representative point inside the droplet, and the distances from the representative point inside the droplet to each of the plurality points on the contour of the droplet;

predicting, by the processor, at least one of a film thickness distribution or a bubble occurrence in a region on the first member based on a result obtained in the step of determining;

evaluating, by the processor, whether the predicted film thickness distribution satisfies a predetermined uniformity criterion;

when the uniformity criterion is not satisfied, automatically modifying, by the processor, at least one of the arrangement information or the distance between the first member and the second member, and repeating the simulation and the determining and the evaluating until the uniformity criterion is satisfied; and outputting, by the processor, a finalized film-forming condition including the arrangement information and the distance between the first member and the second member as a design result to be used by the film forming apparatus, setting, by the processor, a forming condition based on the finalized film-forming condition output by the step of outputting; and forming, by the processor, the film on the basis of the finalized film-forming condition set in the step of stepping, wherein in the step of determining whether one of droplets among the plurality of droplets merges with an adjacent droplet, it is determined that a first droplet and a second droplet adjacent to the first droplet among the plurality of droplets are merged at the predetermined timing, in case of at least one of the plurality of points on the contour of the first droplet is located inside an area of the second droplet, wherein at least each of the step of determining is performed multiple times during a period from a timing of bringing the first member and the second member into contact via the plurality of droplets of the curable composition to a timing of curing the film of the curable composition.

11. A non-transitory computer readable storage medium storing a program for causing a computer to execute a design method for generating a film-forming condition for a film forming apparatus that forms a film of a curable composition by bringing a plurality of droplets of the curable composition arranged on a first member into contact with a second member, wherein the program, when executed by a processor of the computer, causes the processor to perform the steps of:

acquiring, by a processor, information including at least arrangement information of the plurality of droplets and volume information of each droplet to be used in the design of the film-forming condition;

acquiring, by the processor, a distance between the first member and the second member to be used in the film forming process;

executing, by the processor, a simulation that, for each of the plurality of droplets of the curable composition, calculates a distance from a representative point inside the droplet to each of a plurality of points on a contour of the droplet at a predetermined timing based on the simulation information and the acquired distance between the first member and the second member;

determining, by the processor, for each of the plurality of droplets of the curable composition, whether one droplet among the plurality of droplets merges with an adjacent droplet at the predetermined timing based on a positional coordinate of the representative point inside the droplet, and the distances from the representative point inside the droplet to each of the plurality points on the contour of the droplet;

predicting, by the processor, at least one of a film thickness distribution or a bubble occurrence in a region on the first member based on a result obtained in the step of determining;

evaluating, by the processor, whether the predicted film thickness distribution satisfies a predetermined uniformity criterion;

when the uniformity criterion is not satisfied, automatically modifying, by the processor, at least one of the arrangement information or the distance between the first member and the second member, and repeating the simulation and the determining and the evaluating until the uniformity criterion is satisfied; and outputting, by the processor, a finalized film-forming condition including the arrangement information and the distance between the first member and the second member as a design result to be used by the film forming apparatus, setting, by the processor, a forming condition based on the finalized film-forming condition output by the step of outputting; and forming, by the processor, the film on the basis of the finalized film-forming condition set in the step of stepping, wherein in the step of determining whether one of droplets among the plurality of droplets merges with an adjacent droplet, it is determined that a first droplet and a second droplet adjacent to the first droplet among the plurality of droplets are merged at the predetermined timing, in case of at least one of the plurality of points on the contour of the first droplet is located inside an area of the second droplet, wherein at least each of the step of determining is performed multiple times during a period from a timing of bringing the first member and the second member into contact via the plurality of droplets of the curable composition to a timing of curing the film of the curable composition.

12. A computer-implemented design method of designing a film-forming condition for a film forming apparatus that forms a film of a curable composition by bringing a plurality of droplets of the curable composition arranged on a first member into contact with a second member, the method comprising:

predicting, by a processor, a behavior of a curable composition when a plurality of droplets of the curable composition arranged on a first member contact with a second member by executing a simulation including;

acquiring simulation information including at least arrangement information of the plurality of droplets and volume information of each droplets;

acquiring a distance between the first member and the second member;

calculating, for each of the plurality of droplets of the curable composition, a distance from a representative point inside the droplet to each of a plurality of points on a contour of the droplet at a predetermined timing based on the simulation information and the distance between the first member and the second member; and determining, for each of the plurality of droplets of the curable composition, whether one droplet among the plurality of droplets merges with an adjacent droplet at the predetermined timing based on a positional coordinate of the representative point inside the droplet, and the distances from the representative point inside the droplet to each of the plurality points on the contour of the droplet;

setting, by the processor, the film forming condition based on the behavior of the curable composition predicted in the step of predicting, and setting, by the processor, the film forming condition based on the behavior of the curable composition predicted in the step of predicting, outputting, by the processor, the film-forming condition as a design result to the film forming apparatus, and forming, by the film forming apparatus, the film on the basis of the film-forming condition set in the step of outputting, wherein in the step of determining whether one of droplets among the plurality of droplets merges with an adjacent droplet, it is determined that a first droplet and a second droplet adjacent to the first droplet among the plurality of droplets are merged at the predetermined timing, in case of at least one of the plurality of points on the contour of the first droplet is located inside an area of the second droplet, and wherein at least each of the step of calculating and the step of determining is performed multiple times during a period from a timing of bringing the first member and the second member into contact via the plurality of droplets of the curable composition to a timing of curing the film of the curable composition.

* * * * *